United States Patent
Auriemma et al.

(10) Patent No.: US 7,623,551 B2
(45) Date of Patent: Nov. 24, 2009

(54) METHOD, SYSTEM AND PROGRAM PRODUCT FOR SYNCHRONIZING DATA ELEMENTS BETWEEN DEVICES

(75) Inventors: Stephen T. Auriemma, Chelmsford, MA (US); Ashok C. Mammen, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 919 days.

(21) Appl. No.: 10/850,533

(22) Filed: May 20, 2004

(65) Prior Publication Data

US 2005/0259693 A1  Nov. 24, 2005

(51) Int. Cl.
H04J 3/07 (2006.01)
(52) U.S. Cl. .................... 370/503; 370/507; 709/228
(58) Field of Classification Search .......... 370/503, 370/252, 347, 470, 472, 507, 508, 509; 709/227, 709/228
See application file for complete search history.

(56) References Cited

U.S. PATENT DOCUMENTS

| | | | |
|---|---|---|---|
| 6,347,084 B1* | 2/2002 | Hulyalkar et al. ........... 370/347 |
| 6,497,401 B2* | 12/2002 | Flaherty ..................... 261/109 |
| 6,697,382 B1* | 2/2004 | Eatherton .................... 370/503 |
| 2002/0131398 A1* | 9/2002 | Taylor ....................... 370/350 |
| 2002/0141452 A1* | 10/2002 | Mauritz et al. .............. 370/503 |
| 2003/0081557 A1* | 5/2003 | Mettala et al. .............. 370/252 |
| 2004/0136375 A1* | 7/2004 | Koguchi ..................... 370/392 |
| 2005/0180466 A1* | 8/2005 | Franchuk et al. ............ 370/503 |

* cited by examiner

Primary Examiner—Huy D. Vu
Assistant Examiner—Dady Chery
(74) Attorney, Agent, or Firm—Daniel McLoughlin; Hoffman Warnick LLC

(57) ABSTRACT

When a current synchronization between a first device and a second device is commenced, a last anchor for the current synchronization to an initialization time of a previous synchronization between the first device and the second device, and a next anchor for the current synchronization is set to an initialization time of the current synchronization. Then, a set of data elements to be synchronized during the current synchronization is determined. Typically, the set includes only those data elements that have been modified after the last anchor and up to (e.g., before or equal to) the next anchor. When the set of modified data elements is received on the second device from the first device, a device modified timestamp (DMT) for the set of data elements on the second device is set to the next anchor instead of to the current time at which the data elements are received.

22 Claims, 3 Drawing Sheets

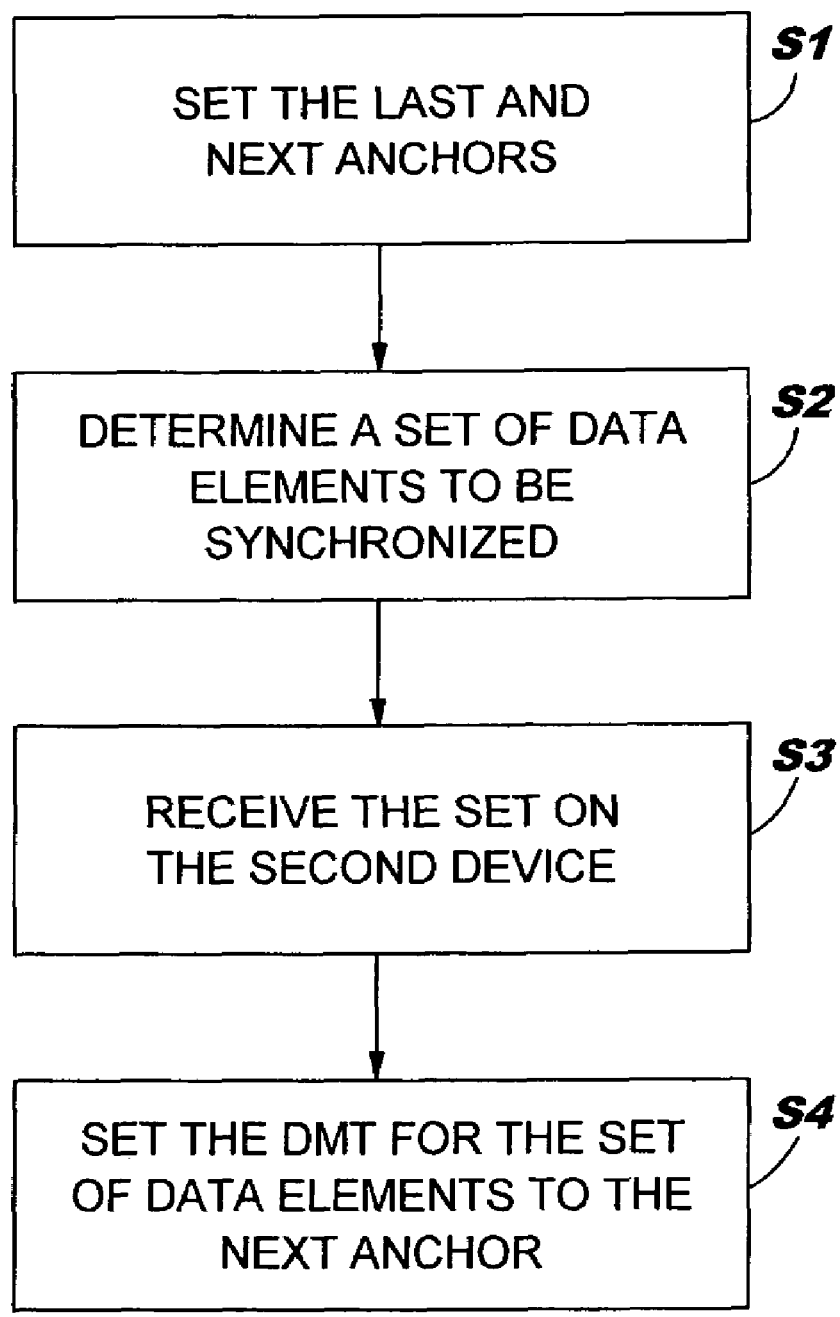

METHOD, SYSTEM AND PROGRAM PRODUCT FOR SYNCHRONIZING DATA ELEMENTS BETWEEN DEVICES

BACKGROUND OF THE INVENTION

1. Field of the Invention

In general, the present invention relates to a method, system and program product for synchronizing data elements between devices. Specifically, the present invention provides a system for synchronizing data elements between devices without resulting in data element re-transmission.

2. Related Art

As the use of pervasive devices such as laptops, personal digital assistants (PDAs) and mobile telephones has increased, a growing reliance on a client-server model to provide data element synchronization has resulted. For example, a user will often operate a PDA in conjunction with a desktop computer or the like. This allows data such as a calendar or contact list to be maintained on both devices. As the user makes changes to the data on one device, those changes should be synchronized to the other device to ensure continuity.

One common protocol that is used for data element synchronization is the SyncML protocol. SyncML is an Extensible Markup Language (XML) protocol under development as an open standard for the universal synchronization of data between devices, one of the most important building blocks in the development of third generation (3G) wireless. The SyncML Initiative was founded in February of 2000, with a stated goal of developing and promoting an open and portable standard for consistent synchronization of remote data across networks, platforms, and devices. SyncML leverages existing standards such as MIME, the vCard, and the iCalendar, in addition to XML.

In general, there are at least two types of synchronization, slow synchronization and fast/normal synchronization. Under slow synchronization, all data on a first device is transferred to a second device. This type of synchronization is typically used when a previous synchronization failed, time anchors became corrupt, a device is in ambiguous state, etc. For example, if a previous synchronization between a PDA and a desktop failed, all data on the PDA could be transferred to the desktop, which would then attempt to resolve any differences. Due to the large volume of data that could be stored on such devices, a slow synchronization is usually only practiced in error situations.

A second type of synchronization is known as a fast or normal synchronization. This type of synchronization transfers only the data that has changed since the last synchronization. For example, if a user synchronized his PDA to his desktop at 1:00 PM on Sunday, then sought to synchronize again at 1:00 PM on Monday, only the data elements that were modified during the intervening time period would be synchronized. For example, if the user's only change to the data between the synchronization operations was to create a new contact on his PDA, only the new contact would be synchronized with the desktop computer.

Unfortunately, as advanced as synchronization technology has become, many disadvantages remain. One such disadvantage is the re-transmission or round-tripping of data elements. Specifically, as currently practiced, each synchronization session has two anchors, namely, a "last" anchor and a "next" anchor. The last anchor is typically the time at which the previous synchronization was initialized (e.g., 1:00 PM Sunday), while the next anchor is typically the time at which the current synchronization was initialized (e.g., 1:00 PM Monday). When a modified data element is received from another device, a device modification timestamp (DMT) for the receiving device is set. The DMT represents the time at which the data element is actually updated on the receiving device (e.g. 1:00 PM Monday). As such, the DMT is some amount of time after the next anchor for the current synchronization session. Accordingly, if a subsequent synchronization was performed on 1:00 PM Tuesday, it would appear that the data element had been modified on the receiving device since the last synchronization. This would result in the same data element being routed back to the original device even though no subsequent modification had actually occurred (i.e., round-tripping).

In view of the foregoing, there exists a need for a method, system and program product for synchronizing data elements between devices. Specifically, a need exists for a system for synchronizing data elements between devices without resulting in data element re-transmission (round-tripping).

SUMMARY OF THE INVENTION

In general, the present invention relates to a method, system and program product for synchronizing data elements between devices. Specifically, under the present invention, when a current synchronization between a first device and a second device is commenced, a last anchor for the current synchronization is set to an initialization time of a previous synchronization between devices, and a next anchor for the current synchronization is set to an initialization time of the current synchronization. Then, a set of data elements to be synchronized during the current synchronization is determined. Typically, the set includes only those data elements that have been modified after the last anchor and up to (e.g., before or equal to) the next anchor. After the set of modified data elements is received on the second device, a device modified timestamp (DMT) for the set of data elements on the second device is set to the next anchor instead of to the current time at which the data elements are received. This ensures that the DMT for the set of data elements will not be greater than the next anchor, which will become the last anchor for a subsequent synchronization. As such, round-tripping of the set of data elements back to the first device will be avoided.

A first aspect of the present invention provides a method for synchronizing data elements between devices, comprising: setting a first anchor for a current synchronization between a first device and a second device to an initialization time of a previous synchronization between the first device and the second device; setting a second anchor for the current synchronization to an initialization time of the current synchronization; receiving a set of modified data elements to be synchronized during the current synchronization on the second device from the first device, wherein the set includes data elements that have been modified after the first anchor and up to the second anchor; and setting a device modified timestamp (DMT) for the set of data elements on the second device to the second anchor.

A second aspect of the present invention provides a system for synchronizing data elements between devices, comprising: means for setting a last anchor for a current synchronization between a first device and a second device to an initialization time of a previous synchronization between the first device and the second device, and for setting a next anchor for the current synchronization to an initialization time of the current synchronization; means for receiving a set of data elements to be synchronized during the current synchronization on the second device from the first device, wherein the set includes data elements that have been modified after the last anchor and up to the next anchor; and means for setting a device modified timestamp (DMT) for the set of data elements on the second device to the next anchor.

A third aspect of the present invention provides a program product stored on a recordable medium for synchronizing data elements between devices, which when executed, comprises: program code for setting a last anchor for a current synchronization between a first device and a second device to an initialization time of a previous synchronization between the first device and the second device, and for setting a next anchor for the current synchronization to an initialization time of the current synchronization; program code for receiving a set of data elements to be synchronized during the current synchronization on the second device from the first device, wherein the set includes data elements that have been modified after the last anchor and up to the next anchor; and program code for setting a device modified timestamp (DMT) for the set of data elements on the second device to the next anchor.

A fourth aspect of the present invention provides a system for deploying a data element synchronization application, comprising: a computer infrastructure being operable to: set a last anchor for a current synchronization between a first device and a second device to an initialization time of a previous synchronization between the first device and the second device, and for setting a next anchor for the current synchronization to an initialization time of the current synchronization; determine a set of data elements to be synchronized during the current synchronization, wherein the set includes data elements that have been modified after the last anchor and up to the next anchor; and set a device modified timestamp (DMT) for the set of data elements on the second device to the next anchor.

A fifth aspect of the present invention provides computer software embodied in a propagated signal for synchronizing data elements between devices, the computer software comprising instructions to cause a computer system to perform the following functions: set a last anchor for a current synchronization between a first device and a second device to an initialization time of a previous synchronization between the first device and the second device, and set a next anchor for the current synchronization to an initialization time of the current synchronization; receive a set of data elements to be synchronized during the current synchronization on the second device from the first device, wherein the set includes data elements that have been modified after the last anchor and up to the next anchor; and set a device modified timestamp (DMT) for the set of data elements on the second device to the next anchor.

Therefore, the present invention relates to a method, system and program product for synchronizing data elements between devices.

BRIEF DESCRIPTION OF THE DRAWINGS

These and other features of this invention will be more readily understood from the following detailed description of the various aspects of the invention taken in conjunction with the accompanying drawings in which:

FIG. 3 depicts a method flow diagram according to the present invention.

Figure 1A:
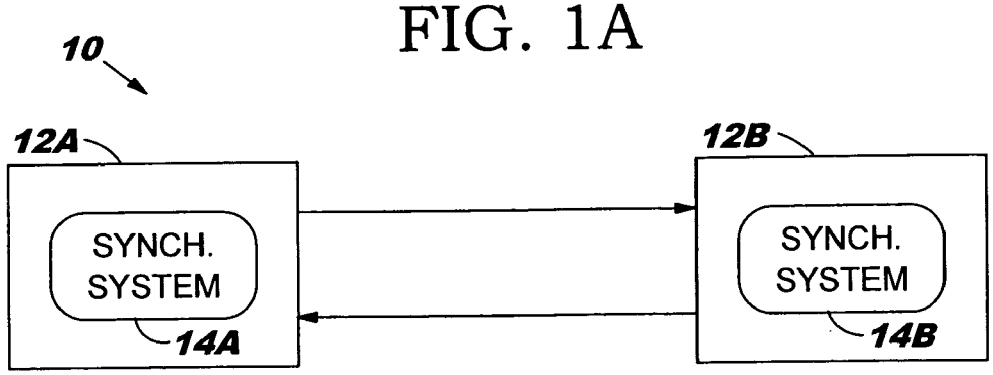
FIG. 1A depicts a system for synchronizing data elements between devices according to one illustrative embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention relates to a method, system and program product for synchronizing data elements between devices. Specifically, under the present invention, when a current synchronization between a first device and a second device is commenced, a last anchor for the current synchronization is set to an initialization time of a previous synchronization between devices, and a next anchor for the current synchronization is set to an initialization time of the current synchronization. Then, a set of data elements to be synchronized during the current synchronization is determined. Typically, the set includes only those data elements that have been modified after the last anchor and up to (e.g., before or equal to) the next anchor. After the set of modified data elements is received on the second device, a device modified timestamp (DMT) for the set of data elements on the second device is set to the next anchor instead of to the current time at which the data elements are received. This ensures that the DMT for the set of data elements will not be greater than the next anchor, which will become the last anchor for a subsequent synchronization. As such, round-tripping of the set of data elements back to the first device will be avoided.

Referring now to FIG. 1A, an illustrative system 10 for synchronizing data elements between devices 12A-B is shown. Under the present invention, devices 12A-B are intended to represent any types of devices between which data can be synchronized. For example, devices 12A-B could represent a PDA and a desktop computer, a laptop computer and a mainframe, etc. To this extent, devices 12A-B could communicate in a client-server environment. For example, if device 12A is a PDA and device 12B is a desktop computer, device 12A could be considered to be a client, while device 12B could be considered to be a server.

Figure 1B:
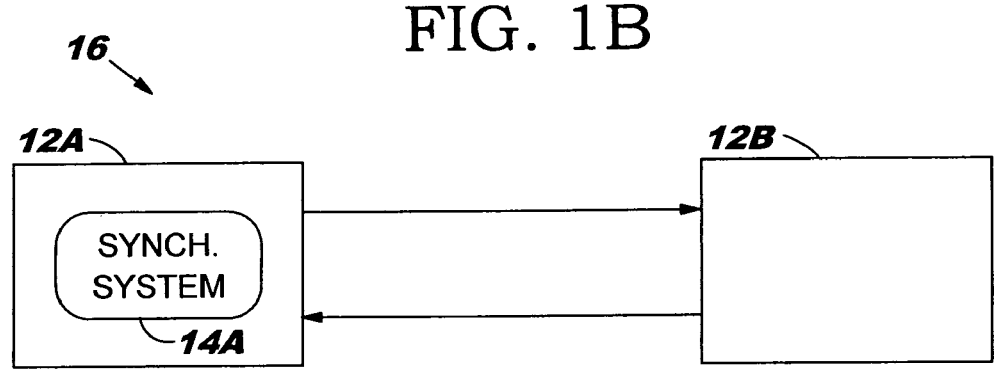
FIG. 1B depicts a system for synchronizing data elements between devices according to another illustrative embodiment of the present invention.
Figure 1C:
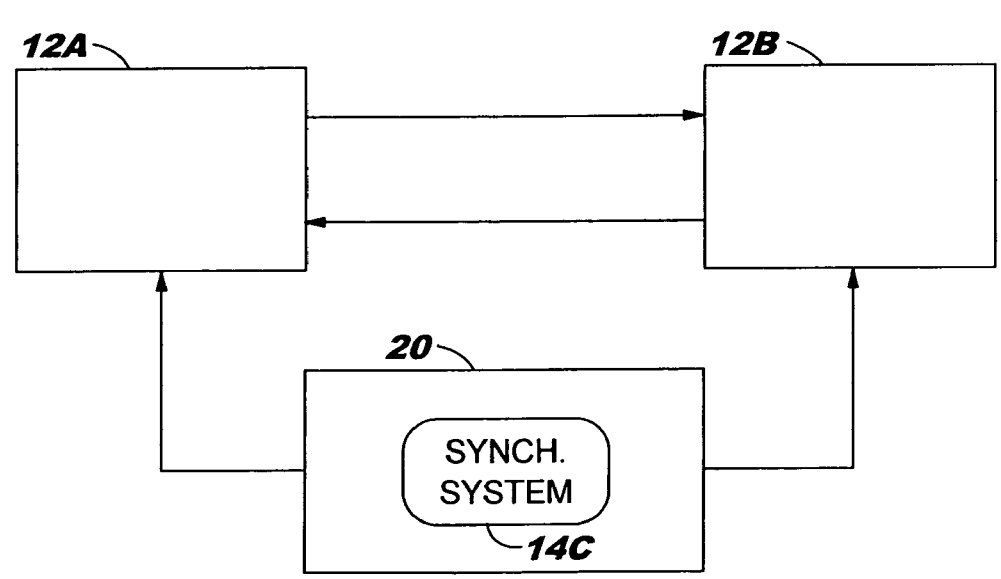
FIG. 1C depicts a system for synchronizing data elements between devices according to another illustrative embodiment of the present invention.

Shown loaded on both devices 12A-B in FIG. 1 are synchronization systems 14A-B. As will be further described below, synchronization system 14A-B allow data elements to be synchronized between devices 12A-B without experiencing round-tripping. In a typical embodiment, both devices 12A-B can include a synchronization system (or certain parts of a synchronization system) loaded thereon. However, this need not be the case. For example, as shown in FIG. 1B, a system 16 could be provided such that only one device (e.g., either device 12A or device 12B) contains a synchronization system. In such an event, the single synchronization system 14A can control the synchronization process for both devices 12A-B. Still yet, neither device might include synchronization system. Rather, as shown by the system 18 of FIG. 1C, a synchronization system 14C could be contained within an independent system 20 that controls the synchronization process for both devices 12A-B. For example, synchronization system 14C could be contained within a computer infrastructure deployed, operated and/or maintained by an independent service provider that facilitates the synchronization of data elements between devices 12A-B. In such a scenario, the owner/operator of devices 12A-B could pay for synchronization services on a fee or subscription basis.

Regardless of the implementation communication between devices 12A-B (and system 20) can occur in any known manner. For example, communication could occur directly, or over a network such as the Internet, a local area network (LAN), a wide area network (WAN), a virtual private network (VPN), etc. In any event, communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity.

Figure 2:
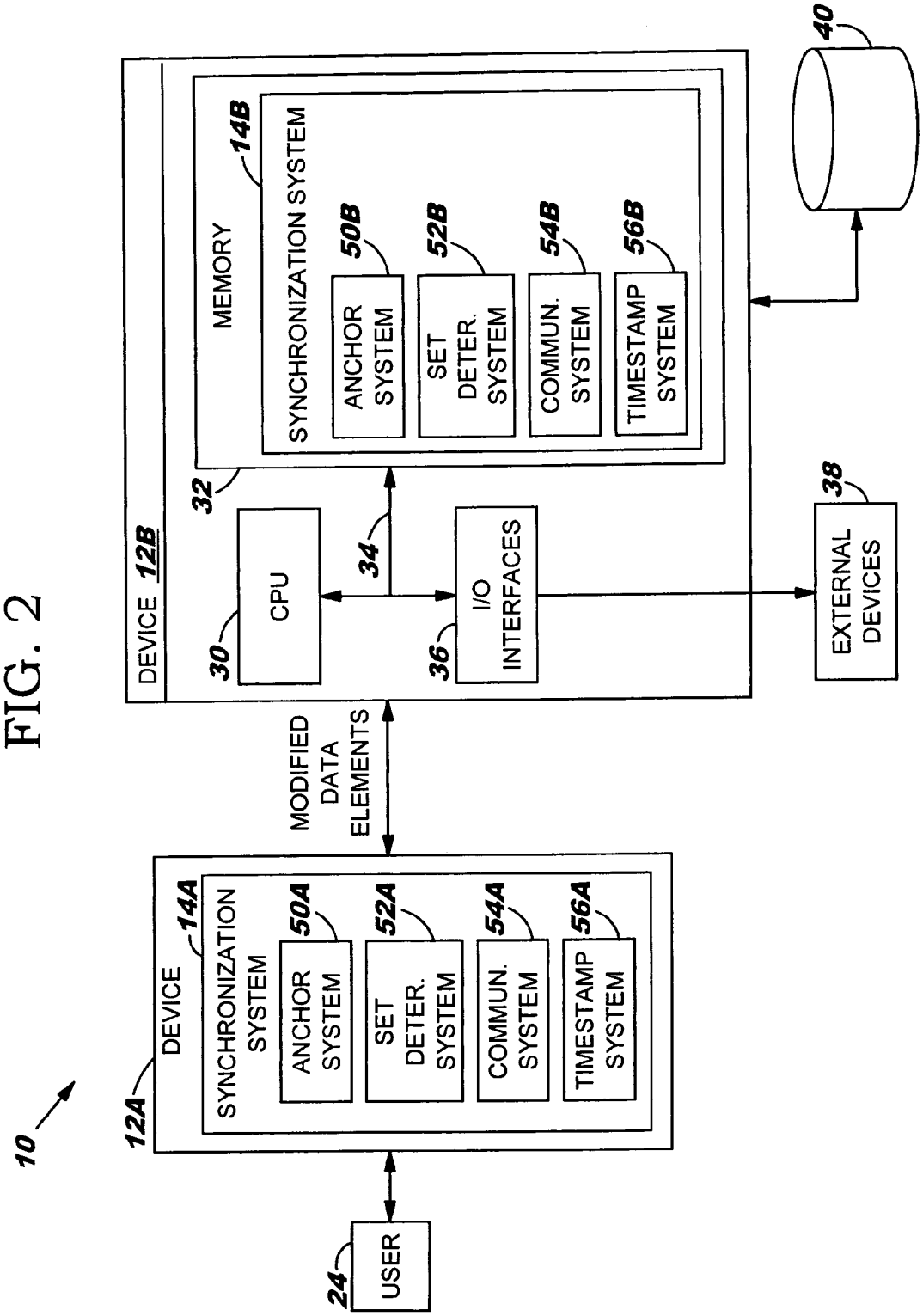
FIG. 2 depicts the illustrative embodiment of FIG. 1A in greater detail.

Referring now to FIG. 2, system 10 of FIG. 1A is depicted in greater detail. In this example, it is assumes that device 12A represents a client such as a PDA and that device 12B represents a server such as a desktop. It should be clearly understood in advance, however, that such an assumption is made solely for illustrative purposes and is not intended to limit the teachings of the present invention.

In any event, as depicted, device 12B generally includes central processing unit (CPU) 30, memory 32, bus 34, input/output (I/O) interfaces 36, external devices/resources 38 and storage unit 40. CPU 30 may comprise a single processing unit, or be distributed across one or more processing units in one or more locations, e.g., on a client and server. Memory 32 may comprise any known type of data storage and/or transmission media, including magnetic media, optical media, random access memory (RAM), read-only memory (ROM), a data cache, a data object, etc. Moreover, similar to CPU 30, memory 32 may reside at a single physical location, comprising one or more types of data storage, or be distributed across a plurality of physical systems in various forms.

I/O interfaces 36 may comprise any system for exchanging information to/from an external source. External devices/resources 38 may comprise any known type of external device, including speakers, a CRT, LED screen, hand-held device, keyboard, mouse, voice recognition system, speech output system, printer, monitor/display, facsimile, pager, etc. Bus 34 provides a communication link between each of the components in device 12B and likewise may comprise any known type of transmission link, including electrical, optical, wireless, etc.

Storage unit 40 can be any system (e.g., a database) capable of providing storage for information such as anchors, UMTs, DMTs etc., under the present invention. As such, storage unit 40 could include one or more storage devices, such as a magnetic disk drive or an optical disk drive. In another embodiment, storage unit 40 includes data distributed across, for example, a local area network (LAN), wide area network (WAN) or a storage area network (SAN) (not shown). It should be understood that although not shown for brevity purposes, device 12A (as well as system 20 of FIG. 1C) will also likely include computerized components similar to device 12B Stored on devices 12A-B are synchronization systems 14A-B. As depicted, synchronization systems 14A-B include anchor systems 50A-B, set determination systems 52A-B, communication systems 54A-B and timestamp systems 56A-B. For illustrative purposes, the functions of these systems will be described in conjunction with the exemplary scenario of data elements being synchronized from device 12A to device 12B. However, it should be understood that the same functions can be practiced to synchronize data elements from device 12B to device 12A. It should also be understood that synchronization systems 14A-B can include components of any other synchronization program now known or later developed. The present invention can be used to augment or replace such existing synchronization programs to prevent round-tripping and other problems associated with existing synchronization systems.

In any event, assume user 24 first synchronized devices 12A-B on Sunday at 1:00 PM. Further assume that on Sunday at 1:30 PM, user 24 modified one or more data elements on device 12A. In this case, those data elements would have a user modified timestamp (UMT) of Sunday 1:30 PM. Also, with respect to device 12A, those data elements would have a DMT of Sunday 1:30 PM. These values can be set by timestamp system 56A. Now also assume that at 1:00 PM on Monday, user 24 sought to again synchronize devices 12A-B. Under a normal or fast synch process, only the data elements that were modified after the Sunday 1:00 PM synchronization would be synchronized (i.e., the modifications made at 1:30 PM on Sunday). Upon initialization of the Monday 1:00 PM synchronization, anchor systems 50A-B would set "last" and "next" anchors on devices 12A-B, respectively. The last anchors are typically set to an initialization time of the previous synchronization. As such, the last anchors will be set to Sunday 1:00 PM. The next anchors will be set to the initialization time of the current synchronization, which in this example is 1:00 PM Monday.

Once the anchors are set, set determination system 52A will determine the set of data elements to be synchronized. Under the present invention, the set of data elements includes the data elements that were modified (e.g., by user 24) after the last anchor and up to (e.g., before or equal to) the next anchor. Accordingly, anything modified after 1:00 PM on Sunday and up to 1:00 PM on Monday will be identified by set determination system 52A and included in the set. Under the present example, the set will include the data elements modified at 1:30 PM on Sunday. In determining the set, set determination system 52A will typically examine the DMTs of the data elements on device 12A. Any data element having a DMT after 1:00 PM Sunday and up to 1:00 PM Monday will be included. In any event, once the set has been determined communication system 54A will transmit the data elements to device 12B (e.g., for reception by communicaiton system 54B). Once received, the set of data elements can be used to update the data elements on device 12B. Then, timestamp system 56B will set a DMT for those data elements on device 12B to the next anchor (e.g., 1:00 PM Monday).

This is in sharp contrast to previous synchronization systems where the DMT for device 12B would have been set to the actual time at which the data elements were modified on device 12B (e.g. Monday 1:00 PM). Specifically, if the DMT was set to the actual time (e.g., Monday 1:00 PM), it would appear as if the data element had been modified after the Monday 1:00 PM synchronization. Thus, in a subsequent synchronization, the same data element to be included in the set of data elements to be synchronized from device 12B to device 12A. In particular, as indicated above, the set of data elements to be synchronized between devices is comprised of the data elements that have been modified after the last session and up to the next session. For example, assume that on Tuesday at 1:00 PM, user 24 sought synchronization from device 12B to device 12A. In this case, anchor systems 50A-B would set the last anchor to the initialization time of the previous synchronization (e.g., Monday 1:00 PM) and the next anchor to the initialization time of the subsequent synchronization (e.g., Tuesday 1:00 PM). Then, set determination system 52B would determine the set of data elements to be synchronized to device 12A. As indicated above, the set would include data elements that have been modified after the last anchor and up to the next anchor (e.g., after Monday 1:00 PM and up to Tuesday 1:00 PM). If the previously synchronized data elements had been assigned a DMT of Monday 1:01 PM, they would be included in the set and communicated back to device 12A (i.e., round-tripped) even though they had not actually been modified had further than they were at 1:30 PM on Sunday.

However, because the present invention sets the DMT for the synchronized data elements to the next anchor instead of to the actual update time on device 12B, this problem is avoided. Specifically, because the set of data elements were assigned a DMT of Monday 1:00 PM (as opposed to Monday 1:01 PM) on device 12B, they will not be included in the set for the Tuesday 1:00 PM synchronization. In contrast, this set will only include data elements modified after the last anchor and up to the next anchor. Since the last anchor for the subsequent synchronization is Monday 1:00 PM, the DMT for those data elements will not exceed the last anchor. Rather, the DMT will be equal to the last anchor, which prevents their inclusion in the set of data elements to be synchronized and avoid round-tripping accordingly.

Regardless, any data elements that were modified after the last anchor and up to the next anchor would be transmitted by communication system 54B to device 12A. Those data elements would then be synchronized on device 12A. Thereafter, timestamp system 56A would set the DMT for the synchronized data elements to the next anchor for the synchronization (e.g., Tuesday 1:00 PM).

It should be appreciated that although the illustrative example set forth above discussed synchronizing data elements from device 12A to device 12B, and then from device 12B to device 12A, this need not be the case. Rather, the invention can be practiced in a similar fashion when synchronizing data elements first from device 12B to device 12A, and then from device 12A to device 12B. It should also be understood that the terms "last" and "next" as used to refer to anchors are used for illustrative purposes only. To this extent, the present invention is not intended to be limited by the terminology used herein. For example, the last and next anchors could be referred to as first and second anchors, low and high anchors, etc. Still yet, it should be understood that the present invention can be realized in hardware, software, or any combination thereof. Any kind of computer/server system(s) or other apparatus adapted for carrying out the methods described herein is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which when loaded in a computer system is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

Referring now to FIG. 3, a method flow diagram 100 for synchronizing data elements between a first device and a second device is shown. As depicted, first step S1 is to set the last and next anchors for a current synchronization session. As indicated above, the last anchor is set to an initialization time of a previous synchronization, while the next anchor is set to an initialization time of the current synchronization. Step S2 is to determine a set of data elements to be synchronized from the first device to the second device. The set will include data elements modified after the last anchor and up to the next anchor. Step S3 is to receive the set of data elements on the second device from the first device. After the data elements are synchronized on the second device, fourth step S4 is to set the DMT for the set of data elements to the next anchor to prevent round-tripping.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the configuration of synchronization systems 14A-B is intended to be illustrative only. Moreover, as indicated above, other systems not shown that exist within current synchronization systems could be incorporated within synchronization systems 14A-B.

We claim:

1. A method for synchronizing data elements between devices, comprising:

providing a first anchor and a second anchor for a current synchronization between a first device and a second device, wherein the first anchor and the second anchor are configured to reflect initialization times of previous or current synchronizations;

setting the first anchor to an initialization time of a previous synchronization between the first device and the second device;

setting the second anchor to an initialization time of the current synchronization;

receiving a set of modified data elements to be synchronized during the current synchronization on the second device from the first device, wherein the set includes data elements that have been modified after the first anchor and before the second anchor; and setting a device modified timestamp (DMT) for each data element within the set of data elements on the second device to the second anchor, wherein the DMT does not reflect the time at which the data element is updated on the second device.

2. The method of claim 1, wherein the first anchor is a last anchor and the second anchor is a next anchor.

3. The method of claim 1, wherein the set includes data elements having a DMT on the first device greater than the first anchor and less than or equal to the second anchor.

4. The method of claim 1, wherein the first device is a client and the second device is a server.

5. The method of claim 1, wherein the first device is a server and the second device is a client.

6. The method of claim 1, wherein the current synchronization is performed according to a SyncML protocol.

7. A system for synchronizing data elements between devices, comprising:

means for providing a first anchor and a second anchor for a current synchronization between a first device and a second device, wherein the first anchor and the second anchor are configured to reflect initialization times of previous or current synchronizations;

means for setting the last anchor to an initialization time of a previous synchronization between the first device and the second device, and for setting the next anchor to an initialization time of the current synchronization;

means for receiving a set of data elements to be synchronized during the current synchronization on the second device from the first device, wherein the set includes data elements that have been modified after the last anchor and before the next anchor; and means for setting a device modified timestamp (DMT) for each data element within the set of data elements on the second device to the next anchor, wherein the DMT does not reflect the time at which the data element is updated on the second device.

8. The system of claim 7, wherein the last anchor for the current synchronization is equal to a next anchor for a previous synchronization.

9. The system of claim 7, wherein the set includes data elements having a DMT on the first device greater than the last anchor and less than or equal to the next anchor.

10. The system of claim 7, wherein the first device is a client and the second device is a server.

11. The system of claim 7, wherein the first device is a server and the second device is a client.

12. The system of claim 7, wherein the current synchronization is performed according to a SyncML protocol.

13. The system of claim 7, further comprising means for identifying data elements that have been modified after the last anchor and up to the next.

14. A program product stored on a recordable medium for synchronizing data elements between devices, comprising:

computer-readable storage medium storing a program having computer executable instructions when executed by a processor to execute;

program code for providing a first anchor and a second anchor for a current synchronization between a first device and a second device, wherein the first anchor and the second anchor are configured to reflect initialization times of previous or current synchronizations;

program code for setting the last anchor to an initialization time of a previous synchronization between the first device and the second device, and for setting the next anchor to an initialization time of the current synchronization;

program code for receiving a set of data elements to be synchronized during the current synchronization on the second device from the first device, wherein the set includes data elements that have been modified after the last anchor and before the next anchor; and program code for setting a device modified timestamp (DMT) for each data element within the set of data elements on the second device to the next anchor wherein the DMT does not reflect the time at which the data element is updated on the second device.

15. The program product of claim 14, wherein the last anchor for the current synchronization is equal to a next anchor for a previous synchronization.

16. The program product of claim 14, wherein the set includes data elements having a DMT on the first device greater than the last anchor and less than or equal to the next anchor.

17. The program product of claim 14, wherein the first device is a client and the second device is a server.

18. The program product of claim 14, wherein the first device is a server and the second device is a client.

19. The program product of claim 14, wherein the current synchronization is performed according to a SyncML protocol.

20. The program product of claim 14, further comprising program code for identifying data elements that have been modified after the last anchor and up to the next.

21. A system for deploying a data element synchronization application, comprising:

a computer infrastructure being operable to:

provide a first anchor and a second anchor for a current synchronization between a first device and a second device, wherein the first anchor and the second anchor are configured to reflect initialization times of previous or current synchronizations;

set the last anchor to an initialization time of a previous synchronization between the first device and the second device, and for setting the next anchor to an initialization time of the current synchronization;

determine a set of data elements to be synchronized during the current synchronization, wherein the set includes data elements that have been modified after the last anchor and before the next anchor; and set a device modified timestamp (DMT) for each data element within the set of data elements on the second device to the next anchor, wherein the DMT does not reflect the time at which the data element is updated on the second device.

22. Computer software embodied in a tangible medium for synchronizing data elements between devices, the computer software comprising:

computer-readable storage medium storing a program having computer executable instructions when executed by a processor;

provide a first anchor and a second anchor for a current synchronization between a first device and a second device, wherein the first anchor and the second anchor are configured to reflect initialization times of previous or current synchronizations;

set the last anchor to an initialization time of a previous synchronization between the first device and the second device, and set the next anchor to an initialization time of the current synchronization;

receive a set of data elements to be synchronized during the current synchronization on the second device from the first device, wherein the set includes data elements that have been modified after the last anchor and before the next anchor; and set a device modified timestamp (DMT) for each data element within the set of data elements on the second device to the next anchor, wherein the DMT does not reflect the time at which the data element is updated on the second device.

* * * * *